June 28, 1927.  
J. A. TAYLOR  
METHOD AND MEANS FOR CONNECTING TUBES  
Filed March 31, 1926  
1,633,798

Inventor:  
James A. Taylor.  
by Wright Brown Quinby May  
attys.

Patented June 28, 1927.

1,633,798

UNITED STATES PATENT OFFICE.

JAMES A. TAYLOR, OF PORTLAND, MAINE.

METHOD AND MEANS FOR CONNECTING TUBES.

Application filed March 31, 1926. Serial No. 98,851.

This invention relates to tube connectors more especially intended for uniting end to end tubes of material such as paper commonly used for cores for winding bolts of fabric or other sheet material. A connector for this purpose should be easily applied and should unite the tube sections securely in axial alinement.

To accomplish these desirable ends, as well as others, the connector of the present invention comprises a tubular member preferably of metal and having axially extending flange portions which may be inserted in slots or kerfs cut inwardly from the ends of the sections to be united, the connector being then fixed to both tube sections as by pounding down the edge portions of these flanges which project outwardly beyond the outer faces of the tubes to be connected.

For a more complete understanding of this invention, reference may be had to the accompanying drawings in which Figure 1 illustrates in perspective the end portions of the tubes formed to receive the connector and the connector positioned therebetween in proper angular relation to the tubes.

Figure 1:
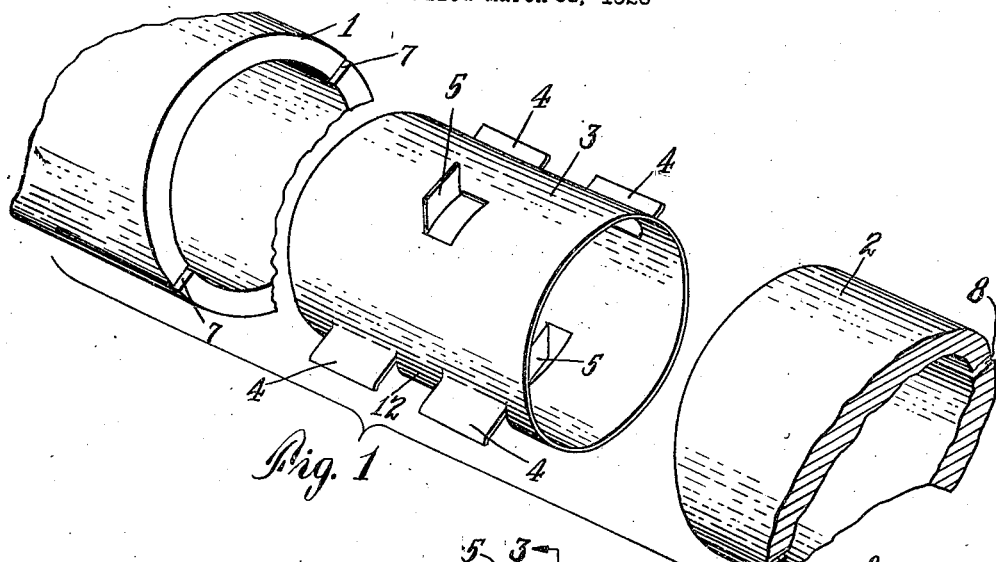
Figure 2:
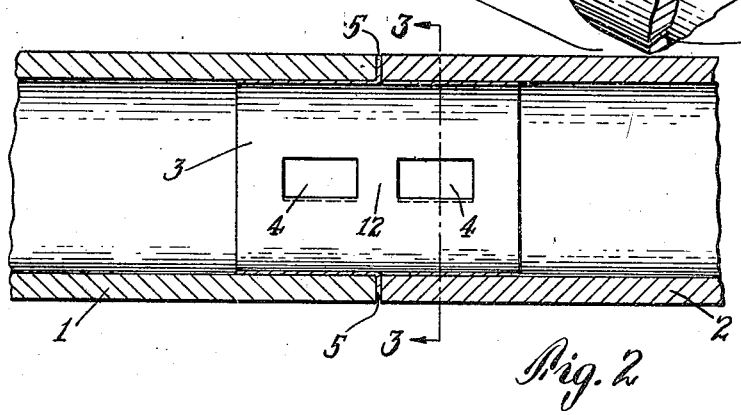
Figure 2 is a central longitudinal section through the joint formed by the connector with the tube ends.

Referring to these drawings, at 1 and 2 are shown the adjacent ends of the tubes to be connected and at 3 is shown the connector. This connector comprises a tubular member preferably of sheet metal of an outside diameter substantially equal to the inside diameters of the tubes 1 and 2 to be connected so that the connector may be inserted in these tube ends preferably with a driving fit. The connector 3 has struck outwardly therefrom axially extending flanges 4, there being as many of these flanges as may be desired, for being shown arranged in spaced pairs diametrically opposite to each other. These, as shown, are formed by cutting channel shaped slots through the connector and bending outwardly the material thus partially severed. Substantially midway of the length of the connector are shown transversely extending flanges 5, two of such flanges being shown. The adjacent ends of the tubes to be connected are formed with longitudinally extending slots or kerfs 7 and 8 corresponding in angular position to the flanges 4, these kerfs being of sufficient width so that the flanges 4 may pass thereinto as the connector is inserted within the tube ends. The connector is inserted within each of the tubes until the flanges 5 prevent further motion, the flanges 5 thus serving as stops to limit the amount of lapping engagement between the connector and each of the tubes 1 and 2 insuring sufficient lapping between the connector and each of the tubes. The flanges 5 are preferably sufficiently short so that their outer ends lie within the peripheral outline of the tubes as thus connected, but the flanges 4 are longer than the thickness of the tube walls so as to extend therebeyond.

Figure 3:
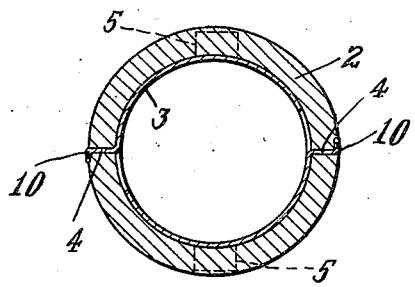
Figure 3 is a transverse section on line 3—3 of Figure 2.

When the tubes and connector have been assembled as thus described, the end portions of the flanges 4 which project beyond the outer faces of the tubes are then pounded down against these outer faces to thus rivet the tubes and connector together, this being shown at 10 in Figure 3. While as shown the flanges 4 are arranged in spaced pairs, of course, if desired, the flanges in axial alinement could be continuous, but forming them spaced in the manner shown provides a bridging portion 12 of uncut tubular material between them which materially stiffens and strengthens the connector. Preferably also the outer ends of the flanges 4 which are to be riveted down against the outer face of the tubes 1 and 2 are initially bent over slightly as indicated in Figure 1 so that a blow struck thereon with a hammer acts immediately in the proper direction to effect bending of these portions toward the outer face of the tubes and thus facilitates the riveting of these portions in position. While two pairs of flanges 4 have been illustrated, it is evident that any number desired might be used, it being only necessary to cut as many kerfs in the tube ends as there are flanges to pass thereinto, but in practice the number and arrangement shown have been found satisfactory for tubes about three inches in diameter.

Having thus described this invention, it is evident that various changes and modifications might be made therein without departing from its spirit or scope as defined by the appended claims.

I claim:

1. A connector for tubes comprising a tubular member of an external diameter substantially equal to the internal diameter of the tubes to be connected, said member having axially extending flanges projectable through slots in said tubes, and means independent of said slots for limiting the extent to which said connector may be forced into each of said tubes.

2. A tube connector comprising a tubular member of sheet material having axially extending flange portions struck outwardly therefrom and a transversely extending flange struck outwardly therefrom adjacent to its center of length.

3. A tube connector comprising a tubular member of sheet material having axially extending flange portions struck outwardly therefrom and a transversely extending flange struck outwardly therefrom adjacent to its center of length, the axially extending flanged portions projecting further outwardly than said transversely extending flange.

4. A tube connector comprising a tubular member of sheet material having axially extending flange portions struck outwardly therefrom and a transversely extending flange struck outwardly therefrom adjacent to its center of length, the axially extending flanged portions projecting further outwardly than said transversely extending flange and having their outer margins bent over.

5. In combination, a pair of tubes having kerfs cut inwardly from their adjacent ends, and a connector comprising a tubular member within and bridging said adjacent ends and having axially extending flange portions, said flange portions extending through said kerfs and having their projecting ends bent over and engaging the outer faces of said tubes.

6. In combination, a pair of tubes having kerfs cut inwardly from their adjacent ends, a connector comprising a tubular member within and bridging said adjacent ends and having axially extending flange portions, said flange portions extending through said kerfs and having their projecting ends bent over and engaging the outer faces of said tubes, and means for limiting the extent of lapping between said tubes and connector.

7. In combination, a pair of tubes having kerfs cut inwardly from their adjacent ends, and a connector comprising a tubular member within and bridging said adjacent ends and having axially extending flange portions, said flange portions extending through said kerfs and having their projecting ends bent over and engaging the outer faces of said tubes, said member having a laterally extending flange projecting between said adjacent ends to limit the extent of lapping between said member and said tubes.

8. The method of uniting tubes in axial alinement which comprises cutting axially extending kerfs inwardly from the adjacent ends of said tubes, inserting in said ends a connector having flanges extending through said kerfs beyond the outer faces of said tubes, and pounding down the projecting portions of said flanges against the outer faces of said tubes.

In testimony whereof I have affixed my signature.

JAMES A. TAYLOR.